(No Model.)
C. V. ROBERTS.
FILTER.
No. 419,023. Patented Jan. 7, 1890.
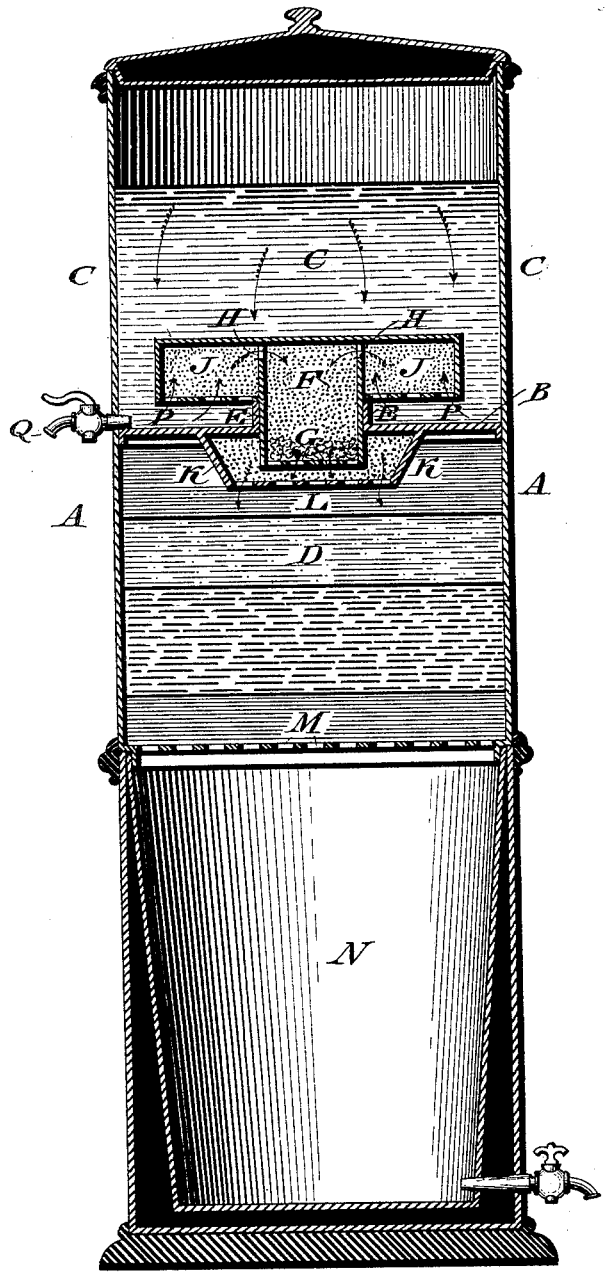
WITNESSES:
INVENTOR: Charles V. Roberts
BY
ATTORNEYS.

UNITED STATES PATENT OFFICE.

CHARLES V. ROBERTS, OF PHILADELPHIA, PENNSYLVANIA.

FILTER.

SPECIFICATION forming part of Letters Patent No. 419,023, dated January 7, 1890.

Application filed July 26, 1889. Serial No. 318,781. (No model.)

*To all whom it may concern:*

Be it known that I, CHARLES V. ROBERTS, a citizen of the United States, residing in the city and county of Philadelphia, State of Pennsylvania, have invented a new and useful Improvement in Filters, which improvement is fully set forth in the following specification and accompanying drawing.

My invention relates to improvements in a filter; and it consists of a filtering-chamber having novel features, as will be hereinafter set forth, and pointed out in the claims.

The figure represents a vertical section of a filter embodying my invention.

Referring to the drawing, A designates a casing having a horizontal partition or diaphragm B, dividing the casing into upper and lower chambers C D, the chamber C receiving the unfiltered water and the chamber D containing layers of filtering material. In the center of the partition B is an opening, the walls of which are extended upwardly, forming a flange E, into which is fitted the vertical filtering-chamber F, which has a perforated bottom G and openings H in its side at the top thereof.

J designates a horizontal filtering-chamber raised above the partition B and having an opening centrally in its bottom, so as to be fitted over the chamber F, said bottom being perforated around said opening, while the remaining walls are closed or solid. Depending from the partition B is a chamber K, the bottom L whereof is perforated. The bottom M of the chamber D is perforated and sustains the filtering material therein, said chamber resting on the reservoir N, which receives the filtered water, and in the present case is of the form of a water-cooler. When the chamber C is primarily supplied with water, it enters the chamber J from below through the perforated bottom thereof, the water then rising in said chamber through the filtering material therein and escaping therefrom through the openings H into the chamber F, where it is again subjected to the action of filtering material as it descends through said chamber F. The water now enters the chamber K, where it is furthermore subjected to filtering action due to the filtering material in said chamber K, after which the water escapes through the perforated bottom L of the chamber, and then flows through the layers of filtering material in the chamber D, it being seen that the filtering is effectively accomplished, owing to the numerous filtering mediums through which the water passes. The space P below the chamber J receives the sediment of the chamber C, the same being removable through the faucet or cock Q. The chamber J may be removed from the chamber F, and the latter may be removed from the flange E, so that the said chamber may be cleansed and the material therein—sponge, gravel, &c.—may be washed and refreshed or renewed, if desired. The chamber K is also accessible for cleansing purposes, and the layers in the chamber D may be also washed and refreshed by passing water through the same, said layers being accessible by removing either the partition B or the bottom M, as desired.

Having thus described my invention, what I claim as new, and desire to secure by Letters Patent, is—

1. A filter having a horizontal diaphragm with central opening, the walls of the opening extending upward, forming a flange, a removable filtering-chamber with openings in its bottom and within said central opening, and a second filtering-chamber having openings in its bottom and communicating with the first-named filtering-chamber, the opening in the bottom of said second filtering-chamber being above the said diaphragm, said parts being combined substantially as and for the purpose set forth.

2. A filter having the partition or diaphragm B, forming an upper water-chamber C and a lower filtering-chamber D, said diaphragm having a central opening with upwardly-extending flange E, the chamber F within the walls of said opening and having the perforated bottom G and the openings H in its side at the top, the chamber J, communicating with the chamber F and having openings in its bottom above the diaphragm B, and the cock Q at the base of chamber C below the chamber J, said parts being combined substantially as described.

3. A filter, with horizontal diaphragm B forming an upper water and a lower filtering chamber, the filtering-chamber F within a center opening in the diaphragm, the filtering-chamber J, communicating with the chamber F and having openings in the base and above the diaphragm, a cock at the base of the upper water-chamber, a reservoir below the perforated bottom of the lower filtering-chamber having an outlet, and a filtering-chamber K below the diaphragm, said parts being combined substantially as described.

4. A filter having a horizontal diaphragm forming an upper water-chamber and a lower filtering-chamber, a removable filtering-chamber adapted to be fitted in an opening in said diaphragm, a second filtering-chamber communicating with said removable chamber and having openings in its base above said diaphragm, and a fixed filtering-chamber secured to said diaphragm on the under side thereof, and an outlet for said upper water-chamber at the base thereof, said parts being combined substantially as described.

CHARLES V. ROBERTS.

Witnesses:
JOHN A. WIEDERSHEIM,
WM. C. WIEDERSHEIM.